Patented Dec. 4, 1923.

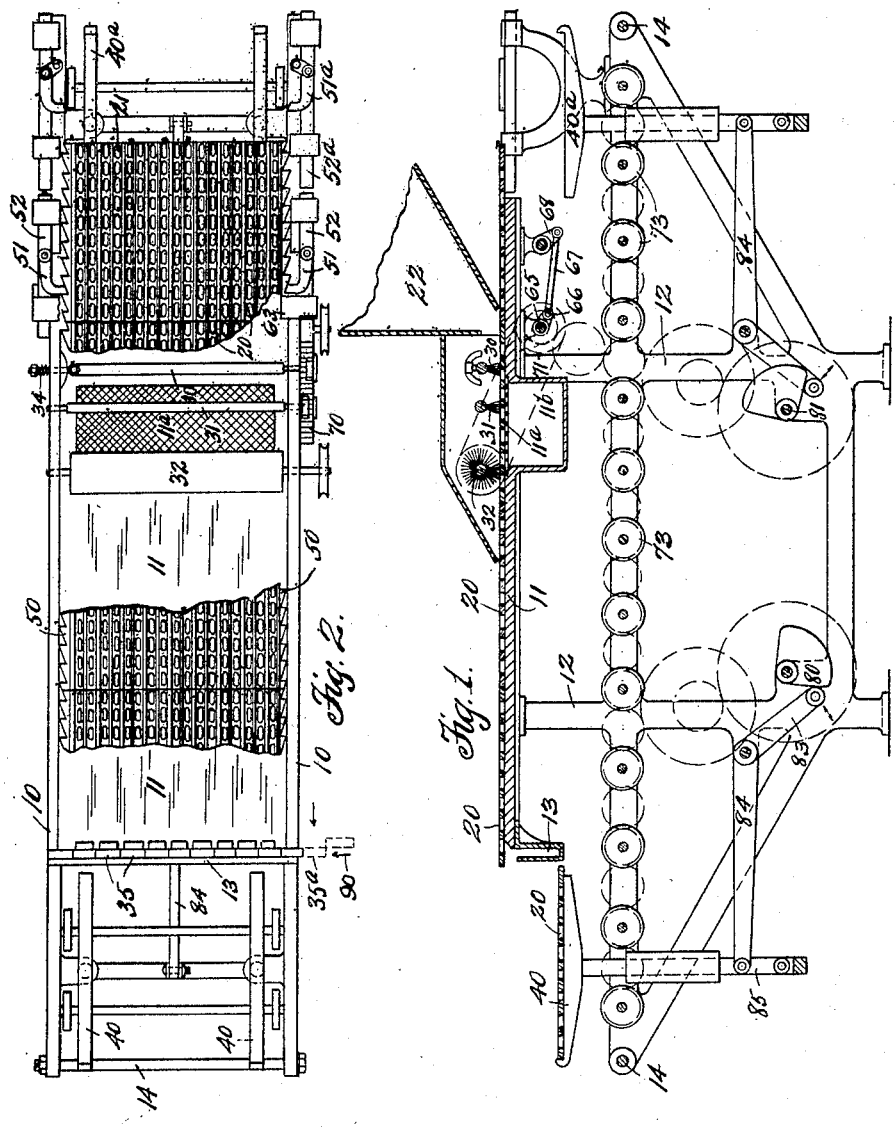

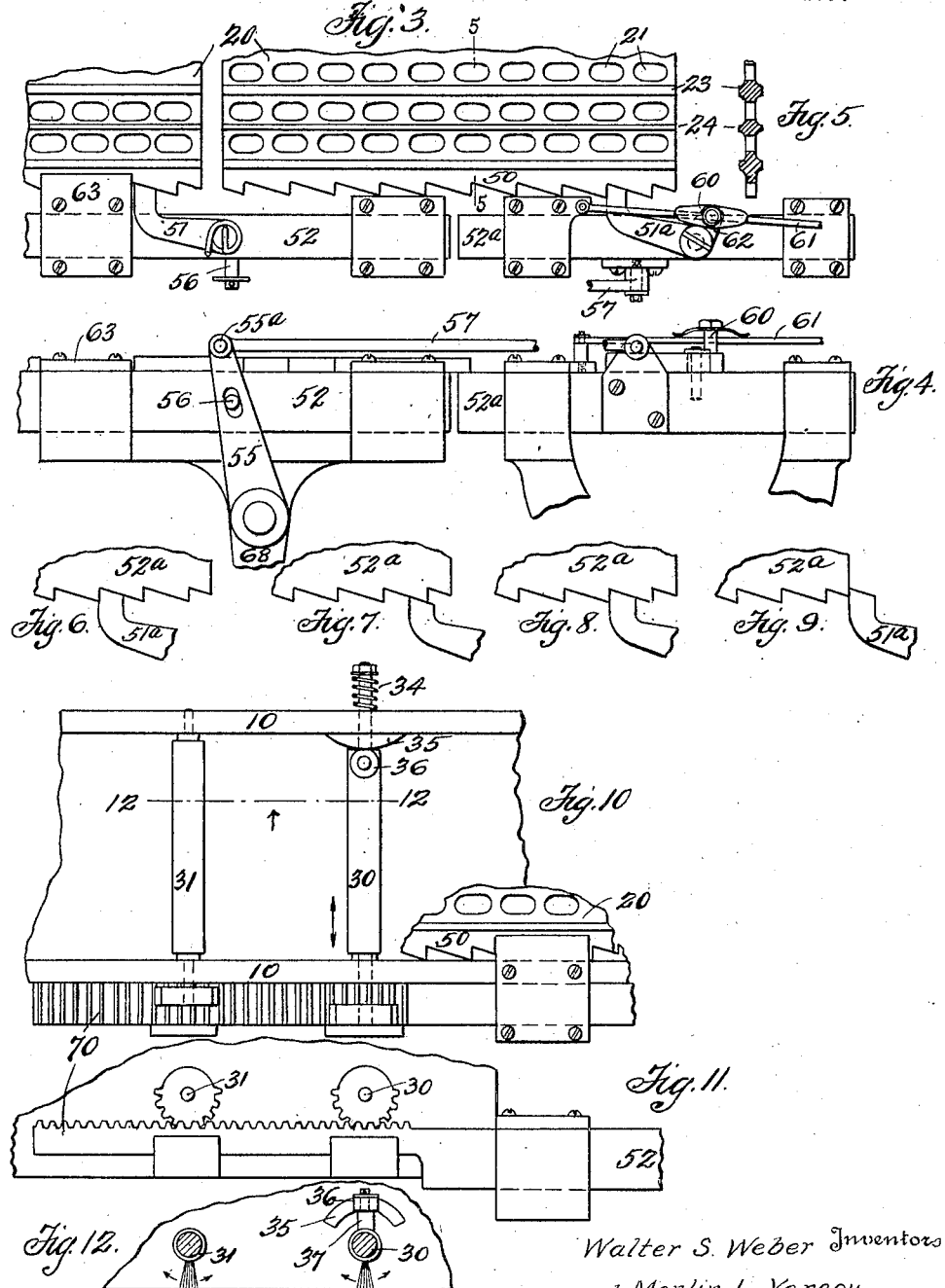

1,476,274

UNITED STATES PATENT OFFICE.

WALTER S. WEBER AND MERLIN L. YERGEY, OF READING, PENNSYLVANIA, ASSIGNORS TO WM. H. LUDEN, INC., OF READING, PENNSYLVANIA, A CORPORATION OF PENNSYLVANIA.

COUNTING AND PACKAGING MACHINE.

Application filed September 5, 1922. Serial No. 586,320.

*To all whom it may concern:*

Be it known that we, WALTER S. WEBER and MERLIN L. YERGEY, citizens of the United States, residing at Reading, in the county of Berks and State of Pennsylvania, have invented certain new and useful Improvements in Counting and Packaging Machines, of which the following is a specification.

This invention relates to mechanism for counting and packaging small articles such as candy tablets, and particularly to mechanism of the type shown in Luden's Patent No. 1,237,351 of Aug. 21, 1917, comprising an open-container feed-way in connection with delivery means movable across said feed-way.

The main object of the present invention is to provide for making a succession of partial deliveries to each of the passing containers; and the several improvements in construction involved are fully described in connection with the accompanying drawings illustrating a preferred embodiment thereof and are clearly defined in the subjoined claims.

Fig. 1 is a sectional longitudinal view showing the general arrangement of cooperating parts employed.

Fig. 2 is a corresponding plan view.

Figs. 3 and 4 are enlarged detail views of the pawl mechanism provided for effecting step-by-step movements of the separate delivery trays or plaques employed.

Fig. 5 is a partial cross-sectional view of these plaques. Figs. 6, 7, 8, and 9 indicate successive relative positions of the separate pawl provided for feeding onward a newly elevated plaque. Figs. 10, 11, and 12 are enlarged views of the specific tablet-distributing mechanism employed.

As shown in the drawings a slide-way table is formed by longitudinal side frames 10, 10, carried by legs 12, 12, and spaced apart by a connecting bed plate 11, cross bars 14, 14, and a transverse container feed-way 13 depressed below the slide frames 10, 10.

The tablet delivery mechanism for delivering articles to the passing containers indicated in the feed-way 13, is moved longitudinally upon the slide-way table, crosswise of said feed way, with a step-by-step movement timed to the movement of the series of carton containers 35 in said feed way; the latter movement being effected by the successive feeding of single empty containers at one end of said feed way and resulting discharge of single filled containers at the opposite end thereof as hereinafter referred to. The general purpose is to cause each container in the passing series to receive a determined number of tablets at each step-by-step movement so as to have received the desired total number of tablets before being discharged.

This tablet delivery mechanism, as shown, comprises a series of separate trays or plaques 20, 20, arranged in endwise abutting position upon the slide-way table and jointly moved thereon step-by-step. Each plaque, as indicated, is formed with longitudinal series of apertures or perforations 21 respectively conformed to the shape of the articles to be packaged, which are oblong tablets as shown. To facilitate the distribution into these perforations, of the tablets continuously supplied to the passing plaques from a suitably fixed hopper 22, raised longitudinal ribs 23, 24 are provided between adjacent longitudinal series of perforations or apertures; the ribs 23 being spaced as shown to correspond with the width of the containers, and two tablets being delivered to each of the latter at each step-by-step movement.

These plaques slide upon the tablet-supporting bed plate 11 extending between the side frames 10, 10, so that the tablets carried in the perforations 21 will be moved onward until the container feed way 13 is reached, when they are free to fall therefrom into the respective containers. For a portion of its length as shown at 11ª, this supporting plate is formed as a screen to permit passage of particles to a receptacle 11ᵇ therefor below the plate; and adjacent thereto and to the feed hopper 22 is provided distributing mechanism for placing the tablets in the perforations 21 for carriage to the container feed way.

This tablet distributing mechanism, as shown, comprises a series of brushes 30, 31, 32. To each of the brushes 30 and 31 is imparted a continuous rocking movement tending to straighten out the tablets between the parallel ribs 23, 24 of the plaques 20 and sweep them into the carrier perforations 21 thereof; this action being made more effective by also imparting a cross-wise axial movement to the brush 30, accomplished by means of a spring 34 and a fixed end cam 35 on which rides a roller 36 mounted upon a radial arm 37 at one end of the brush. The brush 32 is continuously rotated in the direction indicated by the arrow, and serves to keep an excess number of tablets under the distributing action to insure filling of all the perforations.

The passing delivery plaques 20 are continuously maintained in an abutted series upon the slide way table. Being separate parts as shown, this is accomplished by providing cooperating elevators at opposite ends of the table, in connection with a depressed run-way for conveying the emptied plaques from one end of the table to the other; an emptied plaque being received by the elevator 40 after passing the transverse container feed-way 13, and being lowered thereby to the run-way for conveyance to the opposite end elevator 40$^a$ by which it is raised to the table slide-way.

The required step-by-step movements are imparted to the plaques upon the table by means of a pawl and ratchet movement as indicated; each plaque having a ratcheted edge 50 which is engaged by pawls 51 carried by a pawl-bar 52 intermittently operated to move the abutted plaques so as to simultaneously deliver two tablets into each of the cross-wise series of containers.

A gap is necessarily provided between a newly elevated plaque and the end one already in line upon the slide-way table, requiring both an additional feed movement of the former and avoidance of obstruction to its proper elevation. To effect these purposes I employ a supplementary pawl bar 52$^a$ carrying a pawl 51$^a$, and impart a movement to this bar in excess of the regular step-by-step movement imparted to the main pawl bar 52 and with provision for frictionally controlling the engaging movements of said pawl 51$^a$. As shown particularly in Figs. 3 and 4, the main pawl bar 52 is intermittently moved by a suitably rocked pawl-bar 55 having a slotted connection to a pawl-bar pin 56; and the supplementary pawl bar 52$^a$ is also moved by said arm 55, but through a link 57 connected with the extended end 55$^a$ thereof so as to impart greater movement thereto. The swing of the pawl 51$^a$ carried by said supplementary bar 52$^a$ is controlled by a friction slide 60 movable on a fixed friction rod 61 by a bell-crank arm 62 of the pawl 51$^a$; the effect of this arrangement being that said pawl is promptly swung away from the plaque rack by each backward movement of the pawl bar 52$^a$, and is retained in withdrawn position until the succeeding forward movement of said bar 52$^a$ promptly throws it into engagement again. It will be seen that the friction slide 60, which is thereafter moved upon the rod 61 in each direction, serves merely as a substitute for a pawl-engaging spring such as is commonly employed and is indicated in connection with the main pawl 51; the special purpose thereof being to retain the pawl 51$^a$ in withdrawn position while each plaque is being fully elevated. The feeding action of the pawl 51$^a$ upon such newly elevated plaque, as indicated in Figs. 6–9, is the same as the action of the pawl 51 upon the line of abutted plaques ahead of it until its last engagement with said plaque at the end of the latter as indicated in Fig. 9, where it will be seen that the increased movement imparted to the supplementary pawl bar 52$^a$ can now be taken advantage of because the pawl 51$^a$ is in engagement with the end of the plaque at the start of the movement and the entire movement of bar 52$^a$ is imparted to the plaque whereas in other forward movements of the bar 52$^a$, the pawl 51$^a$ moves the distance of half a rack tooth before it moves the plaque. The pawl 51$^a$ is thus caused to engage the end of this plaque so as to effect a movement thereof of about one and a half rack teeth or sufficient to take up the gap and abut it against the plaque ahead of it for subsequent regular feeding by the pawl 51. As the newly elevated plaque is pushed onward by the pawl 51$^a$ into the table slide way it is supported by an overlying plate 63 so as to permit lowering of the elevator as desired for reception of a succeeding plaque. The normal movement of bar 52$^a$ is one and one half rack teeth but it is only effective to move the plaque this increased distance when the pawl 51$^a$ engages the half tooth which is at the end of the plaque.

The described cooperating movements of the several parts of our improved machine may obviously be variedly effected. As diagrammatically indicated a drive shaft 65 directly imparts reciprocating movement to the pawl bars 52 and 52$^a$ by means of a connection 66, 67 to the lever 55 operating these bars; said reciprocating movement also serving to impart rocking movement to the distributing brushes 30 and 31 by means of a rack bar 70, shown as forming part of or movable with the pawl bar 52 and engaging toothed wheels or segments on said brush shafts. A belt wheel 71 on said shaft 65 is indicated as directly rotating the distributing brush 32; while a gear wheel thereon is arranged to drive the connected series of transfer rolls 73, 73, 73 forming the lower plaque run-way. The elevator mechanisms shown comprise similar cam shafts 80, 81 suitably driven with said shaft 65 and set to operate the separate elevators in proper relation through operating connections 83, 84, 85. The series of containers in the transverse feed-way 13 therefor, is maintained and moved onward step-by-step in accord with the described step-by-step movement of the tablet delivering devices 20, by a regularly reciprocated pusher as diagrammatically indicated in Fig. 2 by arrow 90, such pusher operating upon a properly placed succeeding container 35ª. In practice each added container 35ª is placed from a supply continuously furnished by a separate carton-lining machine.

The specific mechanism set forth as practically embodying the invention may obviously be readily modified within the spirit of the invention as fully revealed in connection therewith and defined in the claims.

What we claim is:

1. In a counting and packaging machine comprising a table having a transverse feed way for a passing series of abutted containers; a delivery plaque movable on said table across said container feed way and having a longitudinal series of tablet-carrying perforations for each of such abutted containers, and means for imparting to said plaque step-by-step longitudinal movement to simultaneously effect a limited discharge from the forward line only of each of said series of tablet-carrying perforations into each of the passing containers.

2. In a counting and packaging machine comprising a table having a transverse feed way for a passing series of abutted containers; a tablet-delivery mechanism comprising a plurality of abutting plaques jointly movable on said table across said container feed way and each provided with a longitudinal series of tablet-carrying perforations for each of such abutting containers, and means for imparting to said abutting plaques step-by-step longitudinal movement to simultaneously effect a limited discharge from the forward line only of each of said series of tablet-carrying perforations into each of the passing containers; the successively emptied plaques being separately removable.

3. In a counting and packaging mechanism having a slide way table, a delivery plaque provided with carrier perforations arranged in longitudinal series with raised partitions between them, and tablet distributing mechanism comprising brush devices operative both longitudinally and transversely of the plaque.

4. In a counting and packaging mechanism comprising a table having a transverse open-container feed way for a movable series of alined containers, a series of delivery plaques having tablet-carrying perforations and movable on said table across said feed way, and plaque lowering and elevating platforms at opposite ends of said series with plaque-traversing mechanism between the lowered platforms.

5. In a counting and packaging mechanism comprising a table having a transverse open-container feed way for a movable series of alined containers, a series of delivery plaques having tablet-carrying perforations and movable on said table across said feed way, plaque lowering and elevating platforms at opposite ends of said series with plaque traversing mechanism between the lowered platforms, and intermittently operated pawl mechanism operative upon said series of movable plaques to impart a step-by-step movement thereto.

6. In a counting and packaging mechanism comprising a table having a transverse open-container feed way for a movable series of alined containers, a series of delivery plaques having tablet-carrying perforations and movable on said table across said feed way, plaque lowering and elevating platforms at opposite ends of said series with plaque traversing mechanism between the lowered platforms, and intermittently operated pawl mechanism operative upon said series of movable plaques to impart a step-by-step movement thereto; said pawl mechanism being adapted to impart a special gap-closing movement to each newly elevated plaque.

7. In a counting and packaging mechanism comprising a table having a transverse open-container feed way for a movable series of alined containers, a series of delivery plaques having tablet-carrying perforations and movable on said table across said feed way, plaque lowering and elevating platforms at opposite ends of said series with plaque traversing mechanism between the lowered platforms, and intermittently operated pawl mechanism operative upon said series of movable plaques to impart a step-by-step movement thereto; said pawl mechanism comprising a friction-controlled pawl operative only upon the last elevated plaque.

In testimony whereof we affix our signatures.

WALTER S. WEBER.
MERLIN L. YERGEY.